(12) United States Patent
Brunner et al.

(10) Patent No.: US 7,049,547 B1
(45) Date of Patent: May 23, 2006

(54) METHOD FOR TRANSMITTING DATA AND/OR SYNCHRONIZING AT LEAST TWO WELDING DEVICES AND DEVICE THEREFOR

(75) Inventors: Michael Brunner, Seiersberg (AT); Friedrich Oberzaucher, Wels (AT)

(73) Assignee: Fronius International GmbH, Pettenbach (AT)

( * ) Notice: Subject to any disclaimer, the term of this patent is extended or adjusted under 35 U.S.C. 154(b) by 382 days.

(21) Appl. No.: 10/129,154

(22) PCT Filed: Oct. 17, 2000

(86) PCT No.: PCT/AT00/00269

§ 371 (c)(1),
(2), (4) Date: Sep. 10, 2002

(87) PCT Pub. No.: WO01/32347

PCT Pub. Date: May 10, 2001

(30) Foreign Application Priority Data

Nov. 2, 1999 (AT) ..................................... 1831/99

(51) Int. Cl.
*B23K 9/10* (2006.01)
(52) U.S. Cl. ..................................... 219/132; 219/130.5
(58) Field of Classification Search ............. 219/130.5, 219/130.01, 132
See application file for complete search history.

(56) References Cited

U.S. PATENT DOCUMENTS

| | | | |
|---|---|---|---|
| 3,051,825 A | 8/1962 | Rockafellow et al. |
| 4,095,077 A | 6/1978 | Schneider et al. |
| 4,266,114 A | 5/1981 | Hansen |
| 4,597,082 A | 6/1986 | Hill et al. |
| 4,864,589 A | 9/1989 | Endo |
| 5,276,305 A | 1/1994 | Hsien |

(Continued)

FOREIGN PATENT DOCUMENTS

DE        33 29 336        12/1983

(Continued)

OTHER PUBLICATIONS

Welding in the World 41 (1998). E. Oster. pp. 60-67.

(Continued)

*Primary Examiner*—Clifford C. Shaw
(74) *Attorney, Agent, or Firm*—Collard & Roe, P.C.

(57) ABSTRACT

The invention relates to a method of transmitting data between and/or synchronising at least two welding devices (1, 27) or current sources or with another component and another device, which are supplied with energy via a supply network (35), whereby the functions of the welding process are controlled and/or regulated by means of a control system (4, 30) of the welding device (1, 27). The data, signals and welding parameters or synchronisation signals to be transmitted from a welding device (1, 27) or a welding current source or another component and another device, in particular by a processor, a PLC controller, a data module or a computer, etc., are converted by means of a communication unit (36, 37) into a data protocol which is then modulated by a communication unit (36, 37), in particular a modulation module (42, 43), across the supply network (35). The modulated data protocol is demodulated and processed by means of the preferably integrated communication unit (36, 37), in particular by means of a demodulation module (44, 45), of another welding device (1, 27) or a current source or another component or another device, and another data exchange, in particular a two-way data transfer, is optionally run.

9 Claims, 3 Drawing Sheets

U.S. PATENT DOCUMENTS 5,559,377 A    9/1996   Abraham
5,684,450 A   11/1997   Brown
5,818,821 A * 10/1998   Schurig ..................... 370/293
6,018,136 A *  1/2000   Ohmi et al. ........... 219/130.01

FOREIGN PATENT DOCUMENTS

| DE | 44 12 534    | 3/1995  |
| EP | 0 463 489    | 6/1991  |
| EP | 0575082 A2 * | 12/1993 |
| EP | 0 936 019    | 8/1999  |
| JP | 59193768     | 11/1984 |
| JP | 10-044074    | 2/1998  |
| WO | WO 98/34751  | 8/1998  |
| WO | WO 99/58285  | 11/1999 |

OTHER PUBLICATIONS

Catalogue General 1996-SAF; cover pgs. and pp. 96-101.
The Procedure Handbook of Arc Welding 13$^{th}$ Ed.
The Lincoln Electric Co.; pp. 4-6 and cover pgs.

* cited by examiner

METHOD FOR TRANSMITTING DATA AND/OR SYNCHRONIZING AT LEAST TWO WELDING DEVICES AND DEVICE THEREFOR

CROSS REFERENCE TO RELATED APPLICATIONS

Applicants claim priority under 35 U.S.C. §119 of Austrian Application No. A 1831/99, filed on Nov. 2, 1999. Applicants also claims priority under 35 U.S.C. §120 of PCT/AT00/00269, filed on Oct. 17, 2000. The international application under PCT article 21(2) was not published in English.

The invention relates to a method of for transmitting data one welding device and another welding device.

A welding system is known from patent specification WO 98/34751 A, having at least one welding current source and one or more add-on modules, in particular a wire feed device and a gas supply device, in which every add-on module has a data medium containing the characteristic data for the respective add-on module in a defined format in order to control the control system of the welding device. The data is detected by a detection system and then forwarded via lines or wirelessly to the welding device for additional processing.

The disadvantage of this system is that a data exchange can not be run between the control system and the add-on modules directly and can only be operated via the detection system, for which purpose a user must operate the detection system in order to pick up the data.

Patent specifications U.S. Pat. No. 4,864,589 A and U.S. Pat. No. 5,684,450 A disclose methods of transmitting data between various devices on the supply network via a communication unit, wherein the first device transmits data to the second device, the second device reads and processes this data before a further data exchange can be run between the devices, for which purpose special procedures, in particular special feeder systems, are defined for a data transmission across a supply network.

Data transmission systems for welding devices or welding current sources are known, in which data can be exchanged between two welding devices or welding current sources. These welding devices have an interface connected to the control device for this purpose, for example a RS 232 interface. The user can connect these two interfaces with an interface cable in order to transfer data.

The disadvantage of this system is that the interface cables used are very susceptible to interference and during a welding process, which generates a high degree of interference, can therefore lead to data transmission errors. In addition, in order to be able to run data transmissions, the two welding devices have to be in the same room because there is a limit to the transmission distance over which interface cables can be run.

The underlying objective of the invention is to propose a method of transmitting data between at least two welding devices by means of which data can be transmitted and data can be exchanged reliably, which comprises controlling a welding process by means of a control system, supplying an arc with energy from a current source and striking the arc between a workpiece and a welding torch, supplying the welding device with power between via a supply network, whereby the data is transmitted between the welding devices, transmitting the data, signals and welding parameters or synchronization signals for one of the welding devices via a communication unit across the supply network, whereupon the transmitted data, signals and welding parameters or sunchroization signals are read from the supply network by the other welding device and processed by means of another communication unit and another data exchange is optionally run, and generating a synchronization signal by the one welding device at specific instants of the welding process so that the control system synchronizes control of the welding process on the basis of the synchronization signal.

The advantage of this approach is that a data exchange can be run without having to connect any cabling so that the user of such a welding device does not need any knowledge of any sort. Another advantage resides in the fact that a data exchange can be initiated at any time, including during a welding process, because no additional connections have to be set up between the welding devices. This is particularly useful if data has to be exchanged between two or more welding devices in larger assembly halls because welders or users do not usually carry interface cables with them and usually have to interrupt the welding process for some time.

Another advantage is that the interface cable is not damaged by weld during welding as is the case with the system known from the prior art. The welding device proposed by the invention and the method proposed by the invention obviate the need for such cables, ruling out any interruption in the data transmission as far as possible.

The invention will be described in more detail with reference to an example of an embodiment.

Of the drawings.

Firstly, it should be pointed out that the same reference numbers will be used to denote the same parts in the embodiment described as an example.

Figure 1:
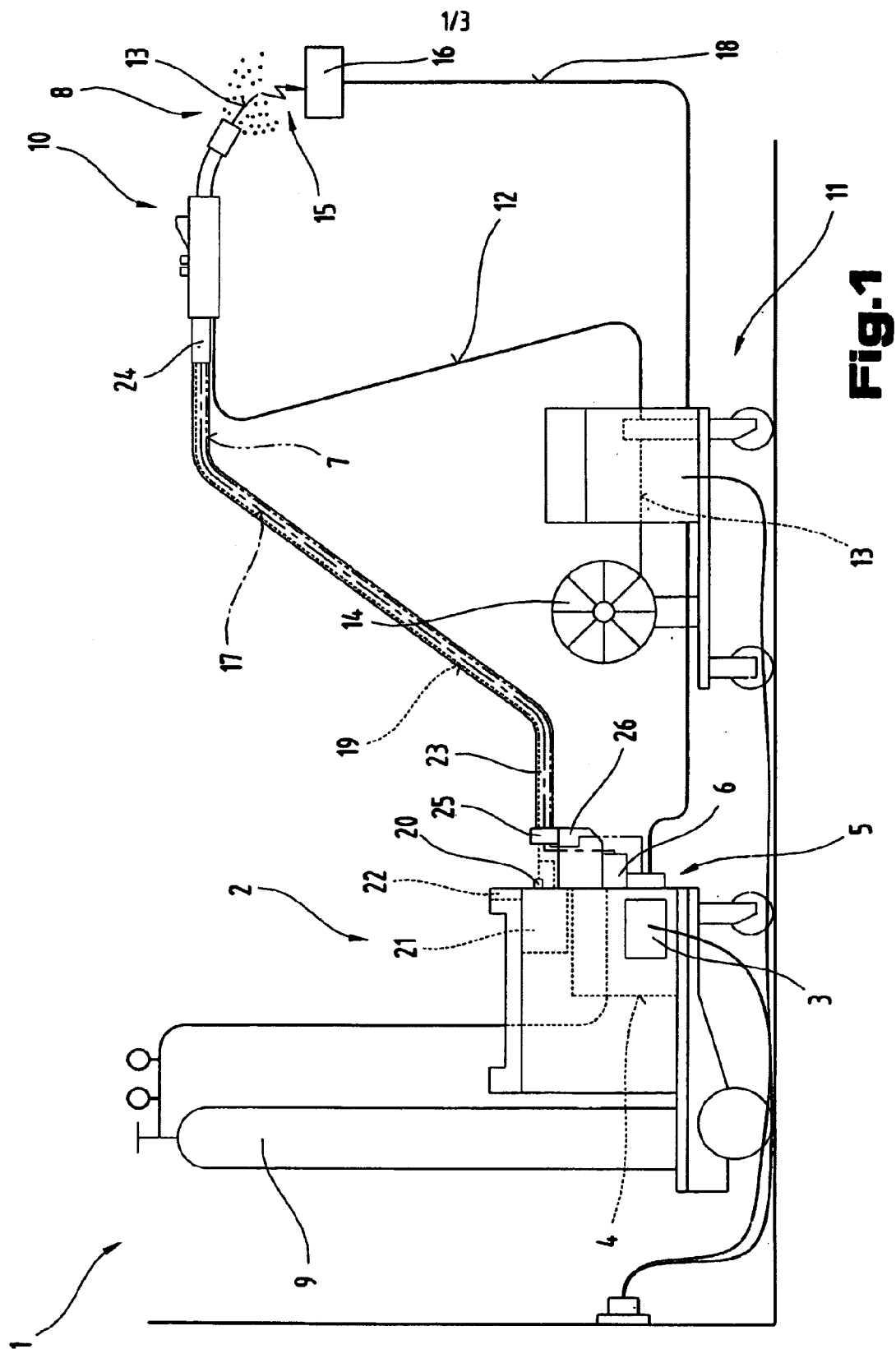
FIG. 1 is a schematic diagram of a welding machine and a welding device.

FIG. 1 illustrates a welding system and a welding device 1 for a whole range of welding processes, e.g. MIG-MAG welding and TIG welding or electrode welding processes. Clearly, the solution proposed by the invention may be used with a current source 2 or a welding current source or a battery charging device.

The welding device 1 has a current source 2 with a power component 3, a control system 4 and a switching element 5 co-operating with the power component 3 and control system 4. The switching element 5 or the control system 4 is connected to a control valve 6 incorporated in a supply line 7 for a gas 8, in particular an inert gas such as $CO_2$, helium or argon and such like, running between a gas storage 9 and a welding torch 10.

Furthermore, a wire feed device 11 such as commonly used for MIG-MAG welding may also be activated via the control system 4 in order to feed a welding wire 13 from a supply reel 14 through a supply line 12 into the region of the welding torch 10. Clearly, the wire feed device 11 could also be integrated in the welding device 1, in particular in the basic housing, in a manner known from the prior art, rather than used as an add-on device as illustrated in FIG. 1.

The current needed to strike an arc 15 between the welding wire 13 and a workpiece 16 is fed via a supply line 17 from the power component 3 of the current source 2 to the welding torch 10 and the welding wire 13, the workpiece 16 to be welded also being connected to the welding device 1, in particular to the current source 2, via another supply line 18 so that a current circuit can be established across the arc 15.

In order to cool the welding torch 10, the welding torch 10 can be connected via a cooling circuit 19, with an integrated flow indicator 20, to a fluid container, in particular a water container 21, so that the cooling circuit 19, in particular a fluid pump used to pump the liquid contained in the water container 21, can be activated when the welding torch 10 is switched on, thereby enabling the welding torch 10 and the welding wire 13 to be cooled.

The welding device 1 also has an input and/or output device 22, by means of which a whole range of settings can be entered for welding parameters and operating modes of the welding device 1. The welding parameters entered at the input and/or output device 22 are then forwarded to the control system 4, from where they are applied to the individual components of the welding system and the welding device 1.

In the embodiment illustrated as an example here, the welding torch 10 is also connected to the welding device 1 and the welding system by means of a hose pack 23. The individual lines from the welding device 1 to the welding torch 10 are disposed in the hose pack 23. The hose pack 23 is connected by means of a connector device 24, known from the prior art, to the welding torch 10, whilst the individual lines in the hose pack 23 are connected to the individual contacts of the welding device 1 by means of connecting sockets and plug connectors. To relieve tension on the hose pack 23, the hose pack 23 is connected via a tension-relieving device 25 to a housing 26, in particular the basic housing of the welding device 1.

Figure 2:
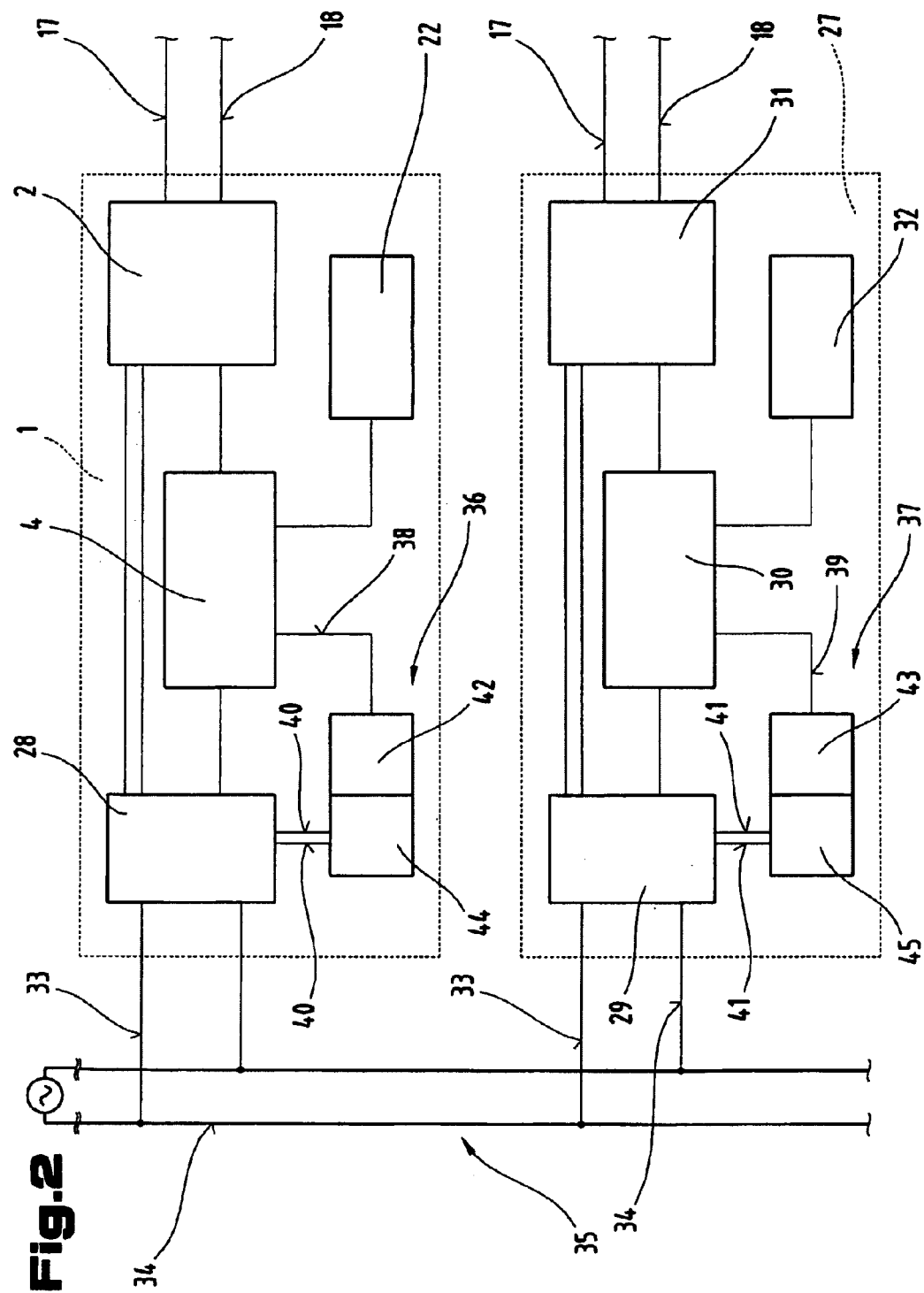
FIG. 2 is a simplified, schematic block diagram of two welding devices as proposed by the invention.
Figure 3:
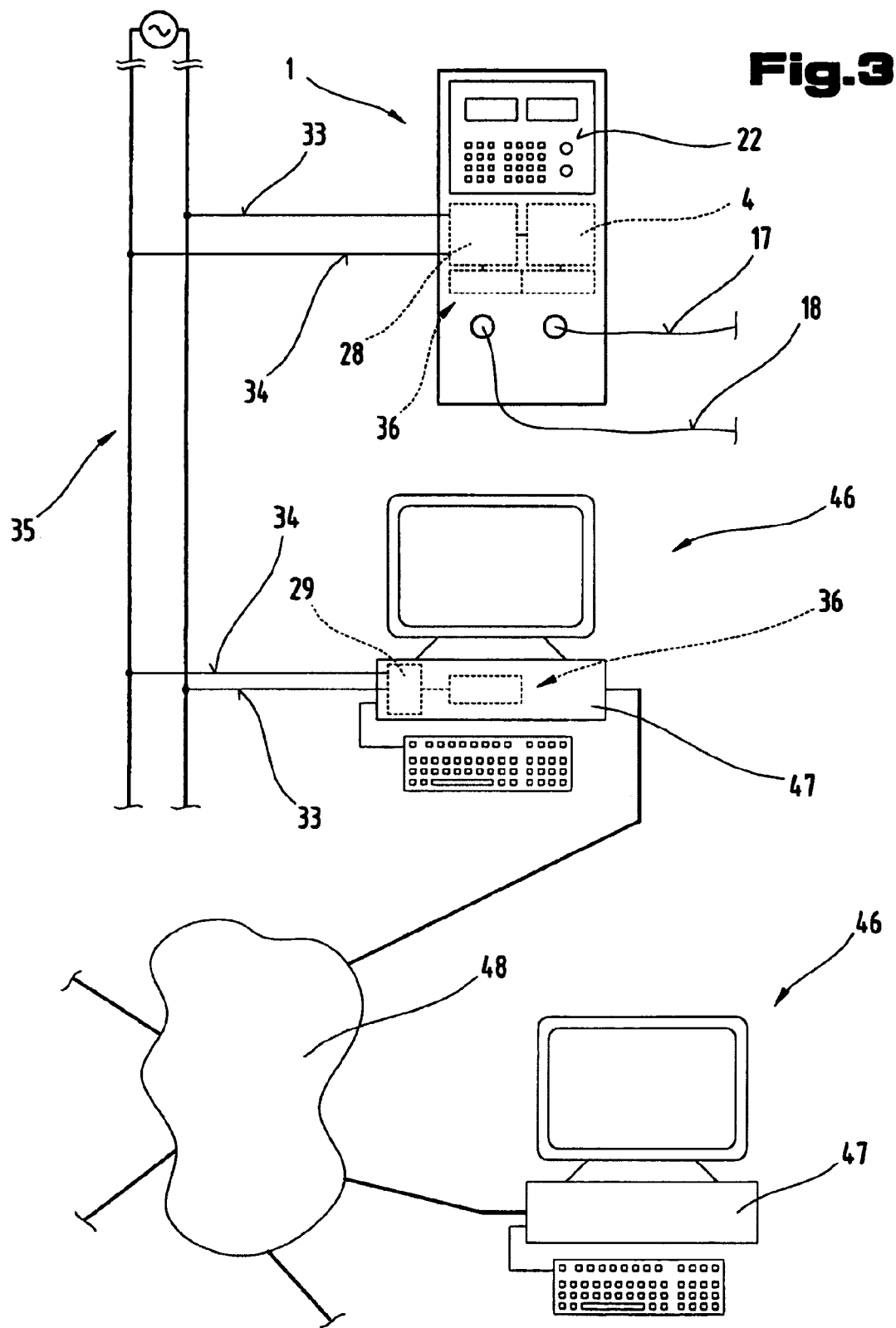
FIG. 3 is a block diagram illustrating a data transmission from one welding device as proposed by the invention to another device, in particular a computer, in simplified schematic form.

FIGS. 2 and 3 show a schematic block diagram illustrating two welding device 1 and 27 configured to enable a data transmission to be operated between them, as well as a welding device with another component or another device, in particular a computer, FIG. 2 illustrating the individual components of the welding devices 1 and 27, comprising a supply unit 28, 29, a control system 4, 30, a current source 2, 31, in particular a current-inverting source, and an input and/or output device 22, 32.

These welding devices 1 and 27 are of the standard construction known from the prior art and the operating principles of the individual components need no further explanation. The individual components may essentially be of any structural design known from the prior art.

The purpose of the supply unit 28, 29 of the welding device 1, 27 is to convert power supplied via feeders 33, 34 from a supply network 35, in particular a single and/or multi-phase alternating voltage supply, to the welding device 1 and 27, in particular to transform an alternating voltage into direct voltage for the individual parts of the individual components, an appropriate voltage for a welding process being fed directly from the supply unit 28, 29 to the current source 2, 31. Clearly, it would also be possible for the current source 2, 31 to be connected directly to the supply network 35 enabling the power supply to be converted directly into welding energy. The supply network 35 is a standard alternating voltage supply of 110V, 230V or 400V, for example, with a frequency of 50 Hz or 60 Hz, for example, as is the case with standard domestic supply, or other supply networks 35, such as a direct voltage network.

The control system 4, 30 may be set up as a microprocessor control system and its purpose is to process the welding parameters set by a user at the input and/or output device 22, 32 and then control or regulate the current source 2, 31 with the set welding method or welding process.

Accordingly, a direct data exchange can be run by the control system 4, 30 with each of the requisite components of the welding device 1, 27. Other components known from the prior art may also be used with the schematically illustrated welding device 1, 27, such as an interface and other additional external components connected in series and/or parallel, although only the most essential components or component groups are depicted in the embodiment illustrated as an example here.

The welding device 1, 27 proposed by the invention also has an additional communication unit 36, 37, which is connected firstly by data lines 38, 39 to the control system 4, 30 and secondly by other lines 40, 41 to the supply unit 28, 29. Clearly, it would also be possible for this communication unit 36, 37 to be provided not as a separate component as illustrated, but to be integrated instead in one of the already existing components. The communication unit 36, 37 is a transmitter and/or receiver system known from the prior art and forms a data transmission system in conjunction with another communication unit 36, 37. Since a standard, commercially available communication unit 36, 37 is used for a data transmission system operated on the supply network 35, this component or component group will not be described in further detail. The communication system 36, 37 has a modulation module 42, 43 and a demodulation module 44, 45 for transmitting data across the supply network 35.

The purpose of these two modules is, firstly, to evaluate data sent and received via the alternating voltage and, secondly, to modulate the data to be sent on the direct voltage of the supply network 35, it also being possible to use all the systems known from the prior art for modulating and demodulating the data or signals, in particular for the modulation modules 42, 43 and demodulation modules 44, 45.

With the welding device 1 and 27 equipped in this manner, it will now be possible to operate a simple data exchange between at least two welding devices 1 and 27. Consequently, a user at one of the two welding devices 1 or 27 can set up the requisite welding process, which can then be sent to another welding device 27 or 1 by linking in to the in-house supply network 35, which is coupled with an external public alternative voltage supply.

Clearly, it would also be possible to run a data exchange from a welding device 1 or 27 to another device 46 or a component, for example with a computer, in particular a computer 47, as illustrated schematically in FIG. 3. This device 46 merely has to be equipped, likewise, with a communication unit 36, 37 compatible with the modulation module 42, 43 and the demodulation module 44, 45. To enable a data transfer to a varied range of devices 46 to be controlled, such as an additional welding device 1 or 27 or the computer 47, the individual devices 46 have a code, which can be preset by the user, so that a device 46 can be directly controlled or selected accordingly whenever this code is sent.

For this purpose, the user activates the data transfer from the input and/or output unit 22 or 32, for example, which will involve the user entering the code of a device 46 or a welding device 1 or 27 to which the data is to be transferred so that all the welding parameters or other programmes, such as an operating system, welding processes or evaluation programmes, for example, stored in a memory in the control system 4 or 27 are forwarded via the data line 38, 39 to the communication unit 36 or 37. The communication unit 36 or 37 will then be able to detect that a data exchange or a data transfer has been requested and will convert the transferred data or welding parameters into a corresponding data protocol. This data protocol will then be modulated by the modulation module 42 or 43 to the alternating voltage of the supply network 35. This being the case, this data protocol may comprise a plurality of bits in the form of a high-frequency signal which is overlaid on the supply voltage, in particular the alternating voltage, of the in-house supply network 35.

By modulating the data onto the supply network 35, the other or one of the other welding devices 27 or 1 connected to the supply network 35 will be able to evaluate this data or this high-frequency signal. To this end, a desired data set for a welding device 27 or 1 can be automatically detected, i.e. every welding device 1 or 27 which has a communication unit 36, 37 of this type will continuously monitor the supply network 35 via the demodulation module 44, 45, obviating the need for the user to enter any settings in order to retrieve a data set. This is possible because all of the welding devices 1 or 27 and devices 46 and computers 47 evaluate the code sent in the data protocol and compare it with their code to enable these other devices 46 to detect whether the data transfer is intended for them or not. Clearly, it would also be possible to run data transfers of this type without a code, although this would mean that every device 46 or welding device 1, 27 equipped with a communication unit 36, 37 would receive this data.

When a corresponding data transfer is initiated by a welding device 1 or 27, it is detected by at least one other welding device 27 or 1 or another device 46. This welding device 27 or 1 or device 46 will then evaluate the high-frequency signal modulated to the supply voltage, in particular the alternating voltage, via the demodulation module 44, 45. Once the demodulation module 44, 45 has received all the transmitted data, it will forward it via the data lines 39 or 38 to the control system 30 or 4, so that this data is available to another user and a corresponding process can be initiated by another welding device 1 or 27, i.e. when a data transfer is sent from a welding device 1 or 27 to a computer 47, a corresponding programme can be launched or a function control run. Consequently, a welding device 1 or 27 is able to activate the computer 47 so that it connects across a telephone network or a network with other devices 46, in particular other computers 47, or sets up an Internet connection 48, enabling data to be downloaded or transmitted by them, as schematically illustrated in FIG. 3.

Naturally, it would also be possible to set up the welding device 1 or 27 directly by means of a data transfer of this type. The advantage of this is that a corresponding control signal or a code is sent at the start of the data transfer, from which the receiving welding device 27 or 1, in particular the control system 30 or 4, can detect that the individual welding parameters previously set on another welding device 1 or 27, in particular by another use, can now be edited.

Furthermore, if using several welding devices 1 or 27 on a supply network 35, a selective data transfer can be run. To this end, every welding device 1 or 27 has its own code, which can be set by the user, for example, or issued directly by the manufacturer. To enable a defined data transmission to be run from one welding device 1 or 27 to another welding device 27 or 1, the code is sent first with the transmitted data protocol, to which corresponding control commands for the welding devices 1 or 27 and for the control systems 4, 30 and the individual data of the desired welding parameters are tagged. Each welding device 1 or 27 or other device 46 connected to the supply network 35 will then receive this data protocol and will be able to detect whether this data transmission is intended for it, depending on the code transferred with it. It would, of course, also be possible to run a so-called two-way data exchange between two or more welding devices 1 or 27 or with other components or devices 46, i.e. a reply or a set of return data or control commands can be sent on the basis of a despatched data protocol. Advantageously, this means that the welding device 1 or 27 which initiated the data transfer across the supply network 35 will be able to detect whether this data transfer was successfully received by the corresponding welding device 1.

The embodiment schematically illustrated in FIG. 2 as an example illustrates a data transfer of this type in operation. In this case, two welding devices 1 and 27 are connected to or coupled with one another across the supply network 35. By connecting two or more welding devices 1 and 27 to the supply network 35, the welding process of the individual welding devices 1 and 27 can be run in synchronisation, thereby eliminating any factors which might otherwise influence the individual welding processes in an application involving one or more workpieces 16. To ensure that the requisite high welding quality is obtained, the two welding devices 1 and 27 are run synchronously, i.e. at any one point in time during the welding process, each welding device 1 and 27 is performing the same function and the same control loop or they and their control loops are co-ordinated or coupled with one another across the supply network 35.

To this end, the user can set up a corresponding welding process from the input and/or output device 22 of a welding device 1, after which the welding parameters are transferred to the other welding device 27, as explained above. Furthermore, the user can set an additional welding parameter in order to synchronise at least one other welding device 27, in which case the control system 30 at the other welding device 27 will now be deactivated. The control system 4 of the welding device 1 will now take over control of the two current sources 2, 31 connected to one another, i.e. when the control system 4 applies a control procedure for the current source 2, this control procedure will simultaneously be forwarded across the supply network 35 to the other welding device 27, whereupon the demodulated signal will be fed from the communication module 37 directly to the current source 31.

Consequently, several current sources of different welding devices 1 or 27 can be controlled or regulated form one control system 4. The slight resultant delay in running time can be disregarded or can be determined by a compensating process between the two welding devices 1 and 27 so that this time delay caused by the data transfer is integrated in the welding process, thereby bringing a significant increase in welding quality.

If, however, two or more welding devices 1 and 27 are connected via the supply network 35, every control system 4, 30 must run the control process independently. In order to ensure that the welding quality remains consistently high, however, the individual welding devices 1 and 27 must be synchronised with one another. This can be achieved in a simple manner by appropriate synchronisation signals for the welding process sent across the supply network 35.

Welding devices 1 and 27 can be synchronised by a system in which one of the connected welding devices 1, 27 assumes a master function, as it were, with which the other welding devices 27, 1, are synchronised. An appropriate signal is transmitted at the start of the welding process so that all linked welding devices 1, 27 commence the welding process at a specific instant. Thereafter, this welding device 1 will generate a synchronisation signal at specific instants during the welding process, which is modulated on the supply network 35 by a communication unit 36. This synchronisation signal is then received by every communication unit 36, 37, so that the control systems 4, 30 of the welding devices 1, 27 can synchronise their control process on the basis of the synchronisation signal. This means that every welding device 1, 27 will able to run a welding process in synchronisation with the master welding device, significantly increasing welding quality. Obviously, in the event of a malfunction of a welding device 1, 27, this state of affairs can be communicated to the master welding device via the supply network 35 so that the synchronous welding process being run by several welding devices 1, 27 can be halted.

In order to ensure that the time lag is kept short for synchronisation purposes, it is an advantage if a compensating cycle is run initially between the individual welding devices 1, 27. The purpose of this compensating cycle is to establish which welding devices 1, 27 are running the welding process so that they can then be activated, after which a synchronisation signal then merely has to be sent without the need to transmit additional control commands or codes or welding data.

The essential advantage of this system resides in the fact that without any additional wiring, in other words without additional interfaces with interface cables, a data exchange or synchronisation between two or more welding devices 1, 27 can be set up, making this type of application perfect for large assembly halls where connecting cables generally have the effect of causing interference. In addition, special welding methods and welding processes can be performed in a simple manner and very rapidly merely by connecting the outputs of the current sources 3, 31, without the need for specially trained personnel.

Naturally, a data exchange can also be run with any other device 46, such as a computer 47 or a PLC controller, for example. Care merely needs to be taken to ensure that these devices 46 have the same communication units 36 or 37 and are capable of demodulating the modulated data protocol. Moreover, any method may be used for running an exchange of data in the form of a data protocol of two devices because a bus system of the type known from the prior art may be used for this type of data transfer. Maintenance work may also be carried out via the communication units 36, 37 of the individual welding devices 1, 27, for example from a computer 47.

The data transfer is not just restricted to the supply network 35 of the firm or assembly hall but can also be operated via so-called free lines to other sites or assembly halls. Accordingly, as mentioned above, a data transfer via the supply network 35 can be initiated from a device of this type, in particular a welding device 1 or 27, by activating another device 46, in particular a processor, a PLC controller or a computer 47, etc., whereupon the other devices 46, in particular the processor, a PLC controller or a computer 47, etc., can convert the data to another network, in particular a data network, such as a DATEX-P network or the Internet 48 or an intranet, for example, thereby enabling a data transfer or a data exchange or a function control or maintenance work to be operated from remote sites without the need for additional cabling. This data transfer or connection structure is schematically illustrated in FIG. 3. A connection can be set up by other devices 46, such as a computer 47, i.e. the welding device 1 or 27 can be activated directly via the supply network 35 or a connection established by the computer 47, via a computer network or the Internet 48, with another computer 47, whereupoin the other computer will be connected via the supply network 35 to the welding device 1 or 27 or vice versa.

It should be pointed out that domestic power networks these days are equipping new buildings with what is referred to as a home network with a serial data network, in other words a home communication system, which can be used for controlling different components such as a washing machine, heating, etc., from a central point via a computer and the method described above can also be used for exchanging data on these home networks. The only thing needed for this purpose is an appropriate communication unit 36, 37 compatible with the home network, which will require an additional line in the power cable of the welding device 1 or 27 to link up to this home network. The welding device 1, 27 could naturally also be equipped with both systems to permit a data transmission depending on the required system, in which case detection of the system will preferably be set up to run on an automatic basis. If used in conjunction with a home network, it is of practical advantage if the communication unit 36, 37 and the data protocol used are compatible with the data protocol of the home network, allowing use to be made of the advantages of the home network, such as activation from a central point, automatic set-up of telephone connections or the set-up of Internet connections.

Finally, it should be pointed out that individual parts and components or groups of components of the embodiments illustrated as examples are depicted in a very schematic and simplified form only. The individual parts of the combinations of features described above in relation to individual embodiments may be used in conjunction with other individual features form other examples of embodiments to provide independent solutions to the invention in their own right.

Above all, the individual illustrations shown in FIGS. 1; 2, 3 may be construed as independent solutions proposed by the invention in their own right. The tasks and solutions of the invention may be found in the detailed description of these drawings.

LIST OF REFERENCE NUMBERS

1 Welding device
2 Current source
3 Power component
4 Control system
5 Switching element
6 Control valve
7 Supply line
8 Gas
9 Gas storage
10 Welding torch
11 Wire feed device
12 Supply line
13 Welding wire
14 Supply reel
15 Arc
16 Workpiece
17 Supply line
18 Supply line
19 Cooling circuit
20 Flow indicator
21 Water container
22 Input and/or output device
23 Hose pack
24 Connection device
25 Tension relieving device
26 Housing
27 Welding device 28 Supply unit
29 Supply unit
30 Control system
31 Current source
32 Input and/output device
33 Delivery line
34 Delivery line
35 Supply network
36 Communication unit
37 Communication unit
38 Data line
39 Data line
40 Line
41 Line
42 Modulation module
43 Modulation module
44 Demodulation module
45 Demodulation module
46 Device
47 Computer
48 Internet

What is claimed is:

1. Method of transmitting data between a welding device and another welding device which comprises controlling a welding process by means of a control system, supplying an arc with energy from a current source and striking the arc between a workpiece and a welding torch, supplying the welding device with power via a supply network, whereby the data is transmitted between the welding devices, transmitting the data, signals and welding parameters or synchronisation signals for one of the welding devices via a first communication unit across the supply network, whereupon the transmitted data, signals and welding parameters or synchronisation signals are read from the supply network by the other welding device and processed by means of a second communication unit and another data exchange is optionally run, and generating a synchronization signal by the one welding device at specific instants of the welding process so that the control system synchronizes control of the welding process on the basis of the synchronization signal.

2. Method as claimed in claim 1, wherein the data, signals and welding parameters or synchronisation signals of a welding process are manually entered in a control unit and are transmitted across the supply network to the other welding device.

3. Method as claimed in claim 1, wherein the data, signals or welding parameters or synchronisation signals are compiled in a data comprising a plurality of bits in the form of a high-frequency signal.

4. Method as claimed in claim 1, wherein the transmitted data, signals or welding parameters or synchronisation signals are continuously monitored by means of the second communication unit co-operating with the welding devices.

5. Method as claimed in claim 1, wherein a control signal is sent at the the transmission of the data, signals or welding parameters or synchronisation signals.

6. Method as claimed in claim 1, wherein in the protocol to be transmitted, a code is sent initially, after which appropriate control commands and data for the desired welding parameters are transmitted to at least one of the welding devices and a control system identified by the code.

7. Method as claimed in claim 1, wherein the data, signals and welding parameters or synchronisation signals of a control sequence are forwarded to the control system of the welding device via the supply network in order to control the other welding device.

8. Method as claimed in claim 1, wherein the time delay caused by the data transfer is determined by an adjustment process between the welding devices and the control systems after which the welding process is controlled so as to start and be run simultaneously.

9. Method as claimed in claim 1, wherein one of the welding devices is defined as the master device and at least one other welding device is synchronised with or timed to it via the supply network.

* * * * *